Dec. 23, 1924.
W. C. MORGAN
FROZEN CONFECTION
Filed Feb. 20, 1922
1,520,302
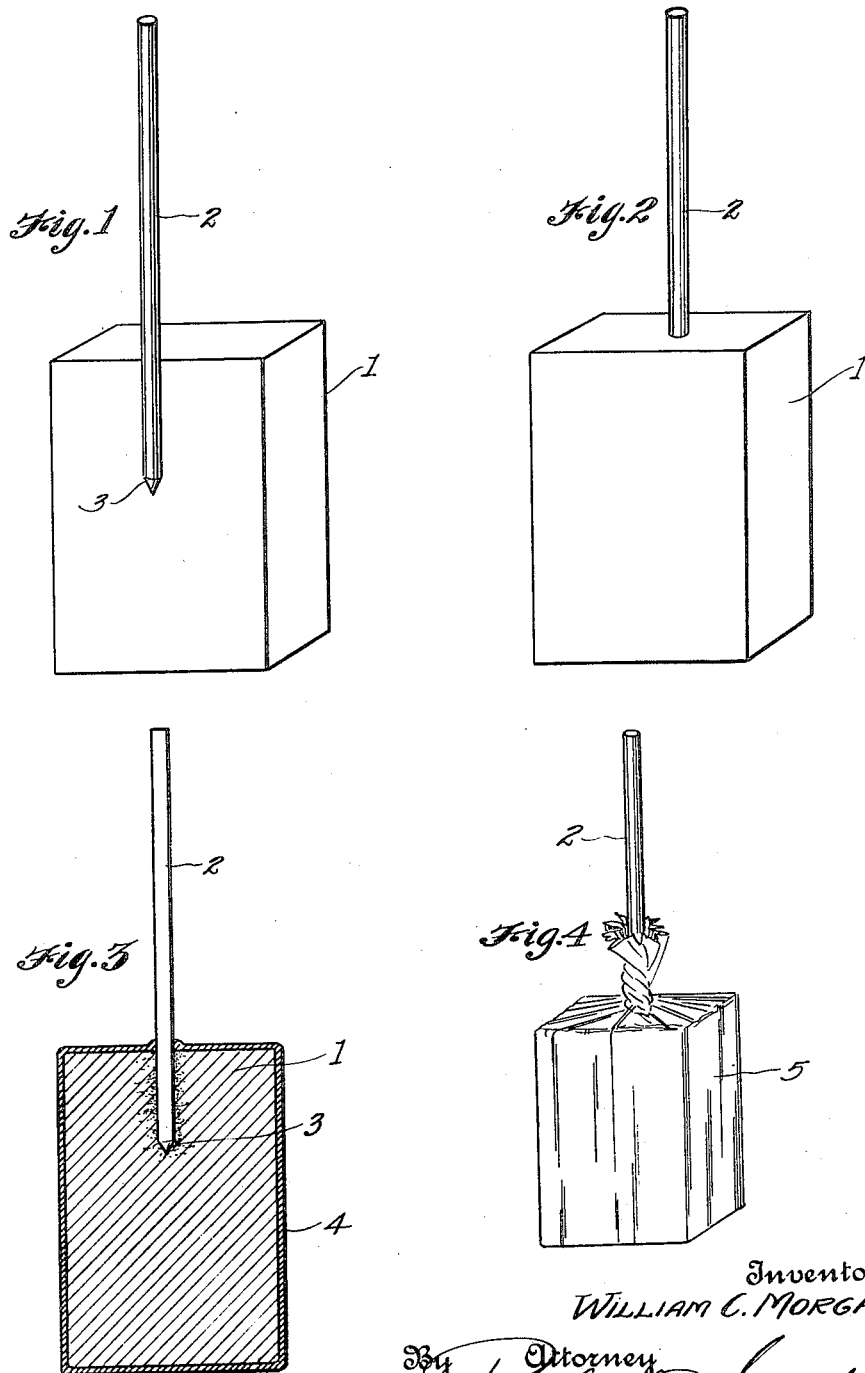

Patented Dec. 23, 1924.

1,520,302

UNITED STATES PATENT OFFICE.

WILLIAM C. MORGAN, OF EVERETT, WASHINGTON, ASSIGNOR TO ZERO ICE CREAM DIPPING MACHINE COMPANY, INC., OF EVERETT, WASHINGTON.

FROZEN CONFECTION.

Application filed February 20, 1922. Serial No. 537,922.

*To all whom it may concern:*

Be it known that I, WILLIAM C. MORGAN, a citizen of the United States, and a resident of Everett, county of Snohomish, and State of Washington, have invented certain new and useful Improvements in Frozen Confections, of which the following is a specification.

My invention relates to a method of preparing and serving frozen confections, particularly ice cream bars, custards and fruits to which has been applied a coating consisting of a combination of fats, sugars, coloring and flavoring extracts.

At the present time chocolate coated ice cream bars are becoming very popular; these bars being usually put up and sold individually in paste board boxes. After being prepared and until sold the bars are kept in a refrigerator, or the like, whereby the ice cream is retained in a frozen condition. One undesirable feature of such bars is that when the bar is held in the hand while being eaten, the coating becomes warm and sticky. This is not only undesirable for the reason that one's hands become soiled, but also is an unsanitary way of eating the articles.

With these above noted disadvantages in view, it is the object of this invention to provide a method and means for preparing and serving ice cream bars, frozen custards and fruits which insures sanitary handling in the making, serving and eating of the articles; it being unnecessary for the hands to contact the same during any of these steps.

More specifically stated, the object of this invention resides in the application of a pin, or stick, to the frozen article whereby the article may be dipped in the coating material, suspended while this coating is setting, and then held while the article is being eaten.

Another object resides in the treatment of the pin, or stick, before it is applied to the frozen article, whereby the stick is caused to fix itself within the article.

In the accompanying drawings, which illustrate the preferred means and method of preparing articles according to the present invention,—

Figure 1 is a perspective view of an ice cream bar and a stick, or pin, which is to be applied thereto.

Figure 2 illustrates the bar with the stick inserted.

Figure 3 is a sectional view of an ice cream bar with the stick inserted therein and a coating applied to the bar.

Figure 4 is a perspective view, showing a bar enclosed within a paper wrapper.

Referring more in detail to the drawings—

1 designates what may be a bar of ice cream, frozen custard or the like, and 2 a wooden stick or pin, preferably provided with a pointed end as at 3; the pin being inserted within one end of the bar with a substantial part extending therefrom so that it may serve as a handle, or stem, whereby the bar may be held while being dipped and while being eaten. About the bar is a thin coating 4 which may consist of a combination of fats, sugars and coloring and flavoring extracts, and which is of such character that after being applied it will set in a very short time and will serve not only to retard melting of the body but will also retain its shape.

In preparing, it is desirable that a wooden pin be used and that this, before being inserted in the ice cream bar, be dipped in warm water and then applied to the bar when the latter is at a temperature of about 0 degree Fahrenheit. The pin being thus moistened, will enter the bar easily and then, due to the moisture thereon and the low temperature of the bar, a frost-like crust will be formed about the inserted portion of the pin which binds it to the bar. After the pin has been applied to the bar, it is used as a handle whereby the bar may be immersed in the coating material and then suspended while the coating sets.

After the coating on the bar has set sufficiently, the bar may be enclosed in a paper wrapper 5 as shown in Figure 4 which will protect it if it is not to be immediately consumed. It is not intended that such wrappers be applied when the articles are served at soda fountains or like places, but when the articles are to be packed in cartons or boxes.

While I have illustrated only an ice cream bar, to which is applied a wooden stem, it is also apparent that the invention need not, nor is it intended to be limited only to this, since frozen custards and fruits can likewise be prepared and served. It may also be desirable to use a wire handle, or a stem of still different material which in some instances may better serve the purpose.

It is further apparent that various substances may be used for the coating material other than that herein mentioned, or, if it is desired, no coating at all need be applied since the pin will remain fixed in the bar without the coating and will serve as a convenient means of holding the bar while it is being eaten.

It is readily apparent that the bars so prepared can be handled in a very sanitary and satisfactory manner and this will add much to the satisfaction of the consumer.

Having thus described my invention, what I claim as new therein and desire to secure by Letters Patent, is:

1. The method of applying a wooden stem to an ice cream bar of a character described, which consists of moistening the stem in warm water, inserting the same within the bar while the latter is at a temperature of about zero degree.

2. The method of affixing a stem to a frozen confection, which consists of moistening the stem and inserting the same within the confection while the latter is in a frozen state.

Signed at Seattle, Washington this 15th day of February 1922.

WILLIAM C. MORGAN.